(12) United States Patent
Oliver et al.

(10) Patent No.: US 7,367,415 B2
(45) Date of Patent: May 6, 2008

(54) HYBRID ELECTRIC VEHICLE ENGINE START TECHNIQUE

(75) Inventors: James L. Oliver, Orion, MI (US); Richard A. Nellums, Farmington Hills, MI (US); Timothy J. Morscheck, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 448 days.

(21) Appl. No.: 11/046,303

(22) Filed: Jan. 28, 2005

(65) Prior Publication Data

US 2006/0169503 A1 Aug. 3, 2006

(51) Int. Cl.
*B60K 6/00* (2007.10)

(52) U.S. Cl. ..................... 180/65.2; 180/369

(58) Field of Classification Search ............... 180/65.2, 180/65.3, 65.4, 364, 365, 369
See application file for complete search history.

(56) References Cited

U.S. PATENT DOCUMENTS

| | | | |
|---|---|---|---|
| 5,856,709 A | | 1/1999 | Ibaraki et al. |
| 6,176,808 B1 | | 1/2001 | Brown et al. |
| 6,250,270 B1 | * | 6/2001 | Ahner et al. ............. 123/179.3 |
| 6,380,640 B1 | * | 4/2002 | Kanamori et al. ........ 290/40 C |
| 6,478,705 B1 | * | 11/2002 | Holmes et al. ................. 475/5 |
| 6,722,332 B2 | * | 4/2004 | Kojima ..................... 123/179.3 |
| 6,805,211 B2 | * | 10/2004 | Fujikawa ................... 180/65.2 |
| 7,114,585 B2 | * | 10/2006 | Man et al. ................. 180/65.2 |
| 7,185,722 B1 | * | 3/2007 | Sakamoto et al. ......... 180/65.2 |
| 7,192,373 B2 | * | 3/2007 | Bucknor et al. ................ 475/5 |
| 2001/0020789 A1 | * | 9/2001 | Nakashima ............... 290/40 C |
| 2003/0029653 A1 | * | 2/2003 | Fujikawa ................... 180/65.2 |
| 2003/0078127 A1 | * | 4/2003 | Kramer ......................... 475/5 |
| 2003/0104901 A1 | * | 6/2003 | Fukushima et al. ............ 477/3 |

FOREIGN PATENT DOCUMENTS

EP 0 941 883 9/1999
EP 1 090 792 4/2001

OTHER PUBLICATIONS

International Search Report for PCT/IB2006/000146.
English Abstract Provided for EP 0 941 883.

* cited by examiner

*Primary Examiner*—Paul N. Dickson
*Assistant Examiner*—Brian Swenson
(74) *Attorney, Agent, or Firm*—Rader, Fishman & Grauer PLLC

(57) ABSTRACT

A hybrid powertrain system includes a first prime mover having an output, a second prime mover having an output, a synchronizing clutch selectively coupling the first prime mover output and the second prime mover output, a multi-ratio transmission having an input, and a planetary gear set selectively coupling the second prime mover output to the first prime mover output or the multi-ratio transmission input based on a coupling state of the synchronizing clutch.

23 Claims, 6 Drawing Sheets

HYBRID ELECTRIC VEHICLE ENGINE START TECHNIQUE

BACKGROUND

The present system and method relate generally to hybrid motor vehicles, and more particularly, to a hybrid powertrain system adapted for installation in a hybrid motor vehicle.

Automobile manufacturers are constantly working to improve fuel efficiency in motor vehicles. Improvements in fuel efficiency are typically directed toward reducing weight, improving aerodynamics, and reducing power losses through the vehicle powertrain. However, the need to improve fuel efficiency is commonly offset by the need to provide enhanced comfort and convenience to the vehicle operator. As an example, manually-shifted transmissions are more fuel efficient than automatic transmissions due to lower parasitic losses. The higher losses associated with conventional automatic transmissions originate in the torque converter, the plate clutches and the hydraulic pump used to control operation of the hydraulic shift system. However, a vast majority of domestic motor vehicles, for example, are equipped with automatic transmissions due to the increased operator convenience they provide. Recent advances in power-operated shift systems have allowed development of "automated" versions of manual transmissions, which automatically shift between sequential gear ratios without any input from the vehicle operator. Thus, automated manual transmissions provide the convenience of a traditional automatic transmission with the efficiency of a manual transmission.

Passenger vehicle and heavy truck manufacturers are also actively working to develop alternative powertrain systems in an effort to reduce the level of pollutants exhausted into the air by conventional powertrain systems equipped with internal combustion engines. Significant development efforts have been directed to electric and fuel-cell vehicles. Unfortunately, these alternative powertrain systems suffer from several disadvantages and, for all practical purposes, are still under development. However, "hybrid" electric vehicles, which include an internal combustion engine and an electric or hydraulic motor, offer a compromise between traditional internal combustion engine powered vehicles and full electric powered vehicles. These hybrid vehicles are equipped with an internal combustion engine and an electric or hydraulic motor that can be operated independently or in combination to provide motive power to the vehicle.

There are two types of hybrid vehicles, namely, series hybrid and parallel hybrid vehicles. In a series hybrid vehicle, power is delivered to the wheels by the electric motor, which draws electrical energy from a generator or a battery. The engine is used in series hybrid vehicles to drive a generator that supplies power directly to the electric motor or charges the battery when the state of charge falls below a predetermined value. In parallel hybrid vehicles, the electric motor and the engine can be operated independently or in combination pursuant to the running conditions of the vehicle.

Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. However, prior art parallel hybrid powertrain systems are relatively inefficient at transitioning from one mode to another, particularly the transition from low-load mode to high-load mode. Furthermore, a majority of prior art hybrid powertrain systems are designed for use in passenger vehicles that employ a relatively light duty gasoline or diesel engine, as opposed to the relatively heavy duty diesel engines found in over-the-road trucks. While hybrid powertrain systems employing a light duty gasoline or diesel engine may be readily transitioned from one operating mode to another without any perceived transition event by the vehicle operator, prior art powertrain systems employing a heavy duty diesel engine are notoriously rough during the transition from one operating mode to another, particularly when the diesel engine is started. Accordingly, there exists a need for improved hybrid powertrain systems that facilitate an efficient and smooth transition from one operating mode to another, particularly in vehicles that employ a heavy duty diesel engine.

SUMMARY

A hybrid powertrain system includes a first prime mover having an output, a second prime mover having an output, a synchronizing clutch selectively coupling the first prime mover output and the second prime mover output, a multi-ratio transmission having an input, and a planetary gear set operatively coupling the second prime mover output to the first prime mover output or the multi-ratio transmission input based on a coupling state of the synchronizing clutch.

An exemplary method of operating a vehicular hybrid powertrain system is also provided including providing a first prime mover having an output, a second prime mover having an output, a synchronizing clutch selectively coupling the first prime mover output and the second prime mover output, a multi-ratio transmission having an input, and a planetary gear set operatively coupling the second prime mover output to the first prime mover output or the multi-ratio transmission input based on a coupling state of the synchronizing clutch. According to a first exemplary embodiment, the planetary gear set is decoupled from the multi-ratio transmission input as the first prime mover is started and accelerated to a velocity substantially equal to a velocity of the multi0ratio transmission input. According to a second exemplary embodiment, the first prime mover is started with the rotation of the second prime mover output during an auto shift event.

BRIEF DESCRIPTION OF THE DRAWINGS

Embodiments of the present system and method will now be described, by way of example, with reference to the accompanying drawings, wherein.

Throughout the drawings, identical reference numbers designate similar, but not necessarily identical, elements.

DETAILED DESCRIPTION

Figure 1:
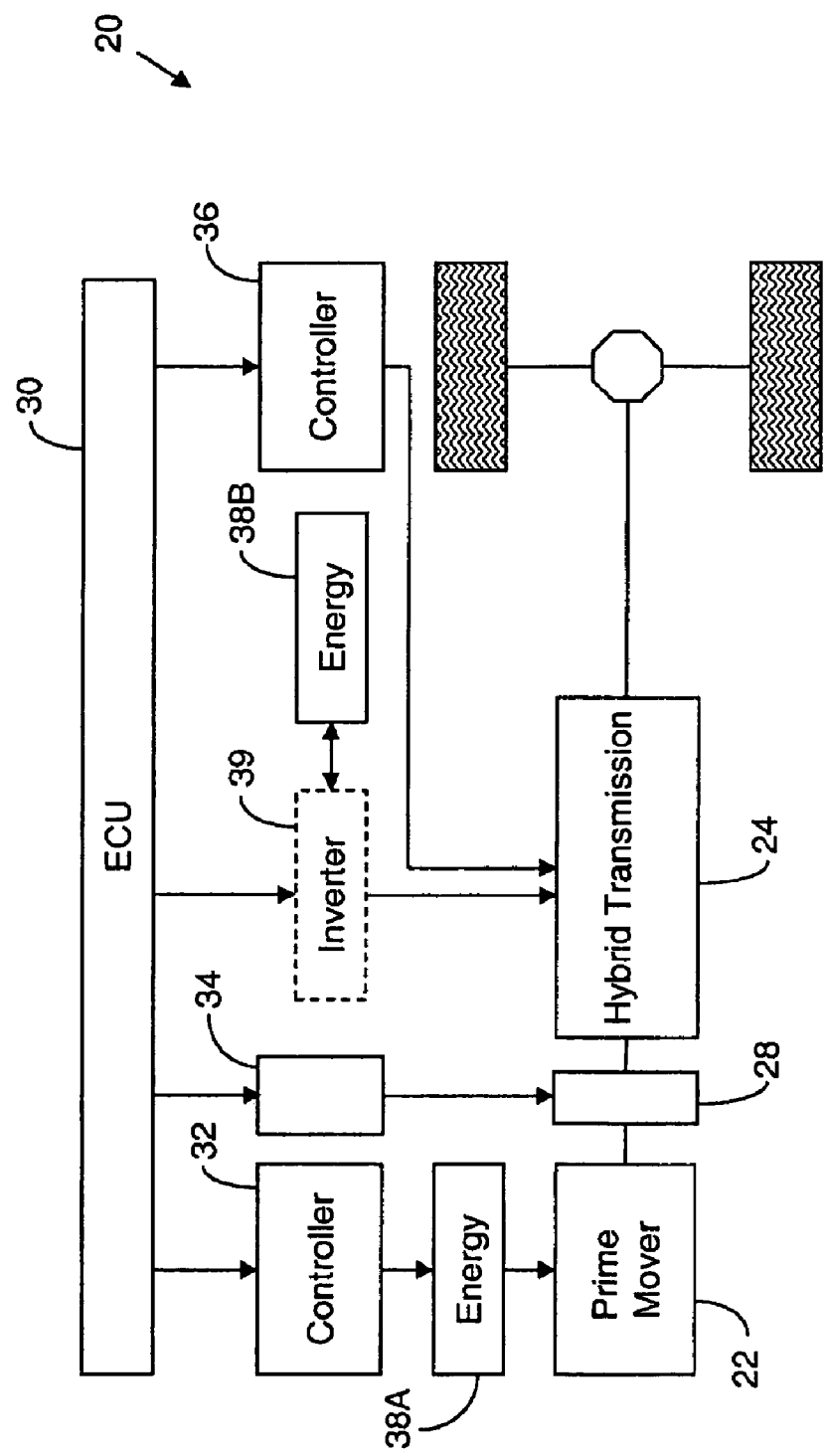
FIG. 1 is a schematic view of a hybrid powertrain system for a motor vehicle.

Referring to FIG. 1, a hybrid powertrain system 20 is shown in accordance with an embodiment of the present system and method. In the illustrated embodiment, powertrain system 20 includes a first prime mover 22, such as a spark-ignited or compression-ignited internal combustion engine, and a hybrid transmission 24 that includes a second prime mover 26 (see FIG. 2), such as an electric motor/generator or hydraulic motor/pump. A main synchronizing clutch 28 is positioned between first prime mover 22 and hybrid transmission 24 to selectively engage/disengage the first prime mover 22 from the hybrid transmission 24. The main synchronizing clutch 28 may be any number of clutches currently known in the art such as a hydraulically or electrically operated friction clutch. As used in the present specification, and in the appended claims, the term "engaged," when mentioned with respect to a clutch, is meant to be understood as resulting in a single or bi-directional clutching action. Similarly, operation in a "dis-engaged" mode is meant to be understood as permitting freewheeling by transmission elements in one or both rotational directions.

Continuing with FIG. 1, the powertrain system 20 may include an electronic control unit (ECU) 30 for controlling operation of first prime mover 22, main clutch 28, and hybrid transmission 24. In a particular configuration, ECU 30 includes a programmable digital computer that is configured to receive various input signals, including without limitation, the operating speeds of first and second prime movers 22 and 26, transmission input speed, selected transmission ratio, transmission output speed and vehicle speed, and processes these signals accordingly to logic rules to control operation of the powertrain system 20. For example, ECU 30 may be programmed to deliver fuel to the first prime mover 22 when first prime mover 22 functions as an internal combustion engine. To support this control, each of the first prime mover 22, the main clutch 28, and the hybrid transmission 24 may include its own controller 32, 34, and 36, respectively. However, it will be appreciated that the present system and method are not limited to any particular type or configuration of ECU 30, controllers 32, 34, and 36, or to any specific control logic for governing operation of the hybrid powertrain system 20.

In the exemplary embodiment illustrated in FIG. 1, the powertrain system 20 also includes at least one energy storage device 38A, 38B for providing energy to operate the first and second prime movers 22, 26. For example, an energy storage device 38A, which is in fluid communication with the first prime mover 22, may contain a hydrocarbon fuel when the first prime mover 22 functions as an internal combustion engine. In another example, the energy storage device 38B may include a battery, a bank of batteries, or a capacitor when the second prime mover 26 functions as an electric motor/generator. When so configured, the electric motor/generator may be provided in electrical communication with the electrical storage device 38B through a drive inverter 39, as is known in the art. Alternatively, the energy storage device 38B may function as a hydraulic accumulator when the second prime mover 26 functions as a hydraulic motor/pump.

Figure 2:
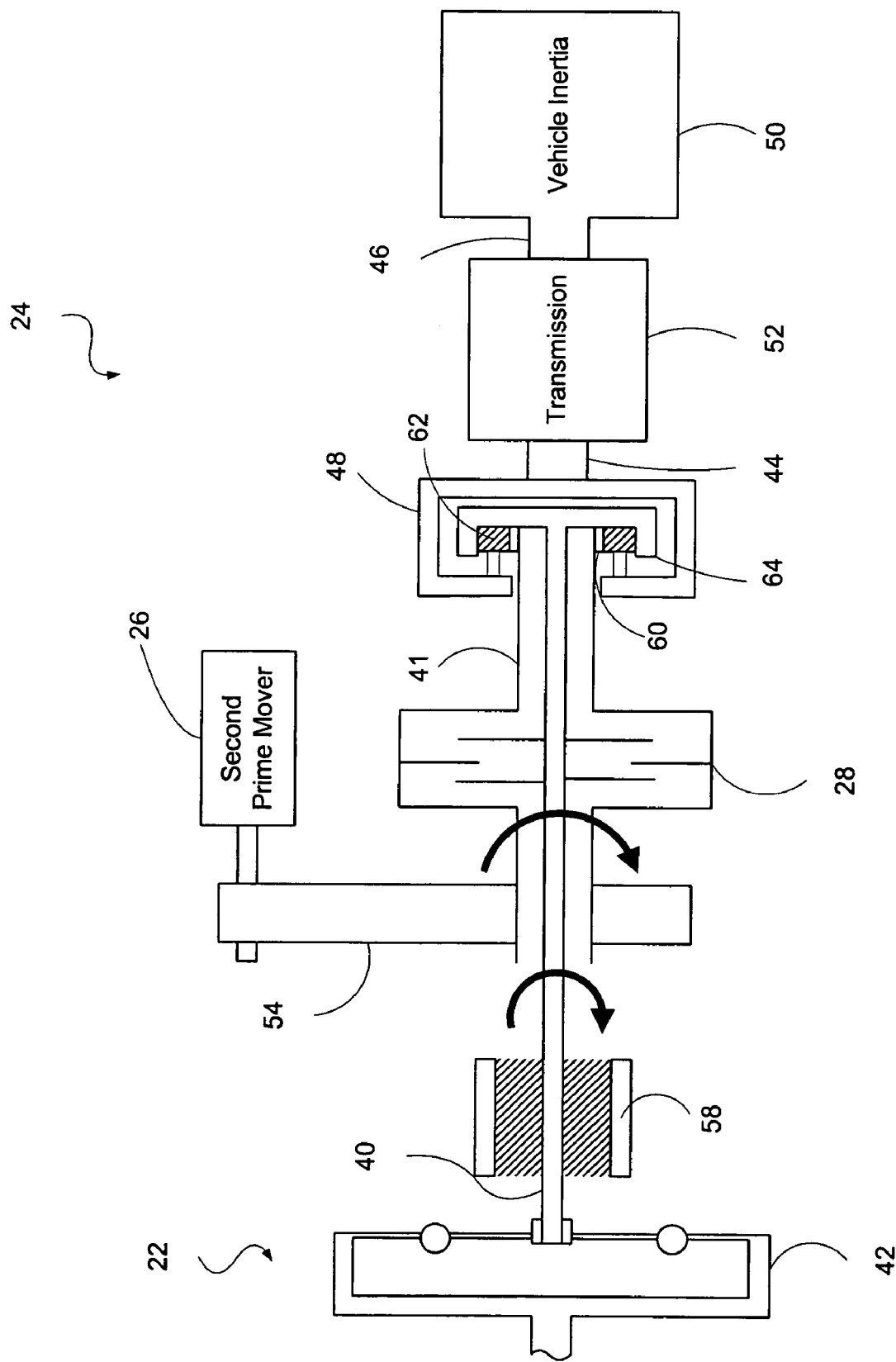
FIG. 2 is a schematic view of a multi-ratio hybrid transmission according to one exemplary embodiment and adapted for use in the hybrid powertrain system shown in FIG. 1.

With reference to FIG. 2 of the accompanying drawings, the components and function of the hybrid transmission 24 will now be described in greater detail. According to one exemplary embodiment illustrated in FIG. 2, the hybrid transmission 24 is coupled to the output of the first prime mover 22 by a main synchronizing clutch 28, which is coupled to a first shaft 40 being output from the first prime mover 22. For illustration, the prime mover 22 is shown as an internal combustion engine in FIG. 2, which generally includes a flywheel 42 and a first shaft 40 coupled thereto. In addition, the hybrid transmission 24 also includes a second shaft 41, coupled to the second prime mover 26, according to one exemplary embodiment, by a motor gear chain 54. While the exemplary gear, chain, and shaft configurations are explained below in detail, a number of alternative gear, chain, and shaft configurations may be interchanged without varying from the teachings of the present system and method.

FIG. 2 illustrates the first shaft 40 being coupled to the hybrid transmission 24 through a reaction member one way clutch 58. The one way clutch 58 may be configured to allow "positive" driveline torque to flow through clutch 58 in a direction from first prime mover 22 toward the multi-ratio transmission 52 while preventing torque-flow in the opposite direction (so called "negative" driveline torque). This feature allows the first prime mover 22 to be reduced to an idle speed or even shut down anytime it is not providing positive driveline torque to the hybrid transmission 24. The one way clutch 58 also isolates the first prime mover 22 during the start sequence to ensure that no driveline reaction torque is imposed thereon (e.g., no negative torque or compression pulses).

In conventional non-hybrid powertrain systems, negative driveline torque is absorbed by the vehicle engine and/or brakes and is therefore lost energy. However, in the hybrid transmission 24 illustrated in FIG. 2, this torque may be used to drive rotation of the second prime mover 26, operating as a generator or a pump, to create and store energy in the energy storage device 38B. Moreover, engine braking may be emulated, which may be desirable even if energy storage device 38B is at capacity. Particularly, the synchronizer clutch 28 may be disengaged to connect the second shaft 41 with the transmission input shaft 44, without coupling the first shaft 40 thereto. In this mode of operation, negative driveline torque may be transmitted from the transmission input shaft 44 through the planetary gear set 48 to the second prime mover 26 via the second shaft 41. The negative driveline torque is prevented from being transmitted to the first prime mover 22 by the one way clutch 58. Additionally, according to one exemplary embodiment, the second prime mover 26 may be prevented from rotating in a second direction. This further reduces the likelihood of negative driveline torque being transmitted to the first prime mover 22.

According to the exemplary embodiment illustrated in FIG. 2, the first shaft 40 is concentrically disposed within the second shaft 41 such that both shafts may independently rotate without interference. Both the first shaft 40 and the second shaft 41 are coupled to a synchronizing clutch 28, or planetary lock-up clutch, prior to terminating at a planetary gear set 48. The exemplary planetary gear set 48 illustrated in FIG. 2 is configured to selectively couple the first shaft 40 and the second shaft 41 to the transmission input shaft 44. According to the exemplary embodiment illustrated in FIG. 2, the second shaft 41 includes a sun gear 60 of the planetary gear set formed thereon for rotation therewith. Additionally, a plurality of planet gears 62 are meshed with the outer surface of the sun gear 60. The planet gears 62 are rotatably coupled to a transmission input shaft 44 that leads to the multi-ratio transmission 52 of the present exemplary hybrid transmission 24. The multi-ratio transmission 52 may include a number of interchangeable gear ratios, as found in any number of change-gear transmissions known in the art, or may include a less traditional power transmission system, such as a continuously variable transmission ("CVT"). Further, a ring gear 64 is formed on the first shaft 40 and is meshed with the outer surface of the planet gears 62 to complete the planetary gear set 48.

As shown in FIG. 2, planetary gear set 48 is arranged so that when second prime mover 26 is operating through the motor gear chain 54 to rotate the second shaft 41 in a first angular direction (such as the clockwise direction illustrated in FIG. 2) and the synchronizing clutch 28 is "engaged," the first shaft 40 is also rotated in the same first angular direction at substantially the same rate, as illustrated by the arrows. Consequently, the rotational power from the second shaft 41 is transmitted through the planetary gear set 48 and into the ring gear portion 64 at a predetermined gear ratio (typically a gear reduction). As illustrated in FIG. 2, the planetary gear ratio multiplies the ratio of the second prime mover 26 to increase its torque, thereby causing the output torque of the second prime mover to be similar to that of the first prime mover 22 when in operation. Transmission of rotational power from the second shaft 41 to the ring gear portion 64 is further transmitted through the first shaft 40 and then into the flywheel 42 of the internal combustion engine 22. In this mode of operation, the inertia from the second prime mover 26 may be used to initiate a start sequence in the first prime mover 22. Further, in this mode of operation, the planet carriers 62 are free to rotate, without transferring rotational power to the transmission input 44.

In contrast, when the synchronizing clutch 28 is disengaged, the first shaft 40 and the second shaft 41 are not coupled and the sun gear 60 and the planet carriers 62 of the planetary gear set 48 are driven to rotate while the motion of the ring gear 64 is limited to rotation in a single direction by the effect of the one way clutch 58 acting upon the first shaft member 40. Consequently, inertia produced by the second prime mover 26 will be transmitted through the planetary gear set 48 and on to the transmission input shaft 44 where it may be further converted to selectively modify the resulting vehicle inertia 50 without losing rotational power to the first prime mover 22. Consequently, in this mode of operation, the second prime mover 26 may be operated to smoothly launch a vehicle employing hybrid transmission 24 without the assistance of the first prime mover 22. A number of exemplary methods for initiating a start sequence in the first prime mover 22, as well as hybrid transmission 24 operation methods, are described below with reference to FIGS. 3, 4A, 4B, and 4C.

Figure 3:
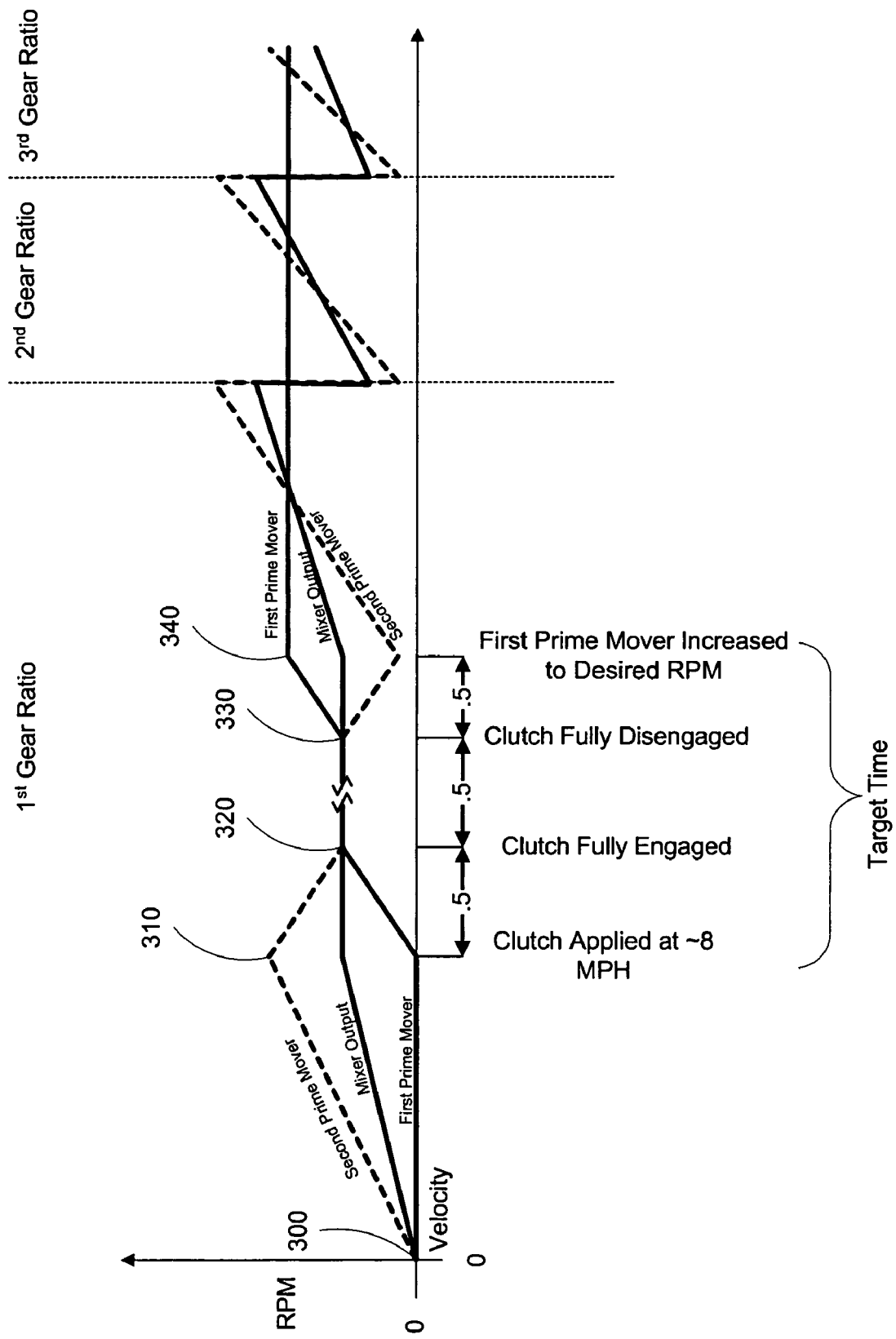
FIG. 3 is a chart illustrating a speed change and energy transfer distribution in a hybrid powertrain system according to one exemplary embodiment.

FIG. 3 illustrates a first exemplary method for initiating a start sequence in a first prime mover 22 using a hybrid transmission such as that illustrated in FIG. 2. As illustrated in FIG. 3, the exemplary start sequence begins with the second prime mover 26 providing the initial kinetic energy 300 to the transmission. After reaching a previously determined velocity 310, the synchronizing clutch 28 is engaged in the hybrid transmission 24 and the first prime mover 22 performs a start-up operation. Once the synchronizing clutch 28 is fully engaged 320, the first prime mover 22 and the second prime mover 26 are both providing substantially the same speed to the transmission input shaft 44. When the first prime mover 22 and the second prime mover 26 are operating at substantially the same speed, the synchronizing clutch 28 is disengaged 330 allowing the transmission 24 to continue in mixer mode. As used herein, a mixer mode is any condition where both the first and the second prime movers 22, 26 are contributing to the mixer output. As illustrated in FIG. 3, the mixer output does not decrease and remains at least constant during the start sequence of the first prime mover 22. The consistency of the mixer output as well as disengaging the synchronizing clutch 28 when the first prime mover 22 and the second prime mover 26 are operating at substantially the same speed provide a start sequence that is undetectable by a vehicle operator. After the synchronizing clutch 28 is disengaged, the first prime mover 22 and the second prime mover 26 are independently controlled until the first prime mover 22 is increased to a desired speed or revolutions per minute (RPM) 340. Once the desired speed or RPM 340 is achieved, the first prime mover 22 is cranked at a constant speed while the velocity of the second prime mover 26 is varied to facilitate shifting.

As illustrated in FIG. 2, when the planetary gear set 48 is operating in mixer mode, the first shaft 40 and the second shaft 41 are not coupled by the synchronizing clutch 28 and the sun gear 60 and the planet carriers 62 of the planetary gear set 48 are free to rotate independently. Additionally, when both the first prime mover 22 and the second prime mover 26 are operating in a same direction not restricted by the one way clutch 58, the ring gear 64 is allowed to rotate. According to one embodiment, input from the second prime mover 26 will cause a clockwise rotation of the sun gear 60 and input from the first prime mover 22 will cause a clockwise rotation of the ring gear 64 as illustrated by the arrows in FIG. 2. Consequently, the planet carriers 62 will provide a multiplication of the generated ratios from the first prime mover 22 and the second prime mover 26, which then drive the transmission input shaft 44. Once the first prime mover 22 is operating at a desired RPM, the first prime mover is maintained at the desired RPM level and velocity increase and decrease of the transmission input shaft 44 is controlled by varying the output of the second prime mover 26. Further details of the exemplary method for initiating a start sequence in the first prime mover 22 and hybrid transmission 24 operation method illustrated in FIG. 3 will be given below.

As illustrated in the first exemplary embodiment of FIG. 3, the initial velocity and kinetic energy 300 of the vehicle incorporating the present hybrid transmission 24 is provided by the second prime mover 26 generating kinetic energy that is applied to the multi-ratio transmission 52 driving the mixer output. In other words, according to one exemplary embodiment, the movement of the vehicle is initially generated by the second prime mover 26 functioning as an electric or hydraulic motor, or operating in the low-load mode. According to the present hybrid transmission 24, the low-load mode may be performed by operating the second prime mover 26 when the synchronizing clutch 28 is disengaged. This configuration "unlocks" the planetary gear set 48, allowing the energy produced by the second prime mover 26 to be transferred to the multi-ratio transmission 52 and to the vehicle inertia 50. The transferred energy is prevented from producing negative driveline torque on the flywheel 42 due to the engagement of the one way clutch 58. As illustrated in FIG. 3, the actual mixer output RPM is less than the RPM of the second prime mover 26 because the velocity of the second prime mover 22 is reduced by a ratio associated with the motor gear chain 54 and the planetary gear set 48, thereby increasing the output torque.

Once the second prime mover 26 has accelerated itself and the mixer output to predetermined desired velocities, the synchronizing clutch 28 is applied 310 to crank the first prime mover 22. As mentioned previously, the synchronizing clutch 28 couples the first shaft 40 and the first prime mover 22 to the hybrid transmission 24. As the first shaft 40 and the second shaft 41 are coupled, the planetary gear set 48 begins to be locked-up as previously mentioned. Locking of the planetary gear set causes the one-way clutch 58 torque to go to zero and allows kinetic energy from the rotating second prime mover 26, operating as an electric motor, to bypass the planetary gear set 48 and begin accelerating the first prime mover 22. Additionally, by locking up the planetary gear set 48, the ring gear 64 and the sun gear 60 will be synchronized in their rotation, allowing the planetary gears 62 to rotate freely, eliminating the transfer of rotational power from the planetary gear set to the transmission 52. In this mode of operation, rotational power from the second prime mover 26 may be used to start or crank the first prime mover 22 functioning as an internal combustion engine. When the synchronizing clutch 28 is engaged, the planetary gear set 48 is locked up and the rotation of the second shaft 41 is transferred to the first shaft 40 where it begins cranking the first prime mover 22 and driving it toward the speed of transmission input shaft 44, or the mixer output that is being maintained by vehicle inertia 50. During the transfer of torque from the second prime mover 26 to the first prime mover 22 for cranking, additional positive torque may be applied to the second prime mover as desired to accelerate the first prime mover to the speed of the transmission input shaft 44. Using the rotational power from the second prime mover 26 to crank the first prime mover 22, rather than using the vehicle inertia, avoids interrupting the drive line of the transmission 24 and prevents an operator from sensing an indication of negative torque.

Once the first prime mover 22 starts, the speed of the first prime mover 22 is quickly increased under the assistance of the second prime mover 26, which provides for a relatively smooth start and engine acceleration sequence. This feature is particularly useful in powertrain systems that employ heavy duty diesel engines that start roughly and slowly increase in speed when not assisted to smoothly transition the powertrain system to "parallel" operation. During the time the first shaft 40 is accelerating, vehicle velocity is at least partially maintained by inertia of the vehicle. As the kinetic energy is being transferred to the first prime mover 22 and as all velocities are approaching the same value, any excess energy goes into accelerating the output and the vehicle. If there is insufficient energy, some will be extracted from the output, decelerating the vehicle. Consequently, the output of the planetary gear set 48 is either constant or increasing while the synchronizing clutch 28 is engaged. A small amount of positive torque during transitions is often desirable. By maintaining the mixer output at a substantially constant or increasing velocity, and by eliminating a connection between the transmission input 44 and the first 22 and second prime movers 26, the start sequence and subsequent acceleration of the first prime mover 22 is unnoticeable by a vehicle operator. Once the first prime motor 22 is started, it by-passes the planetary gear set 48 and there is no reaction torque on the mixer output, provided that the kinetic energy taken from the second prime mover 26 substantially matches the kinetic energy needed to bring the first prime mover 22 functioning as a diesel or other IC engine to the predetermined RPM 320.

When the clutch is fully locked-up, the first shaft 40 and the second shaft 41, associated with the first prime mover 22 and the second prime mover 26 respectively, are operating at substantially identical velocities in parallel drive. While operating in parallel drive, additional positive torque may be provided to accelerate the mixer output, as desired. According to one exemplary embodiment illustrated in FIG. 3, as discussed in more detail below, the first primary motor 22 and the transmission input shaft 44 will be operating at 800 RPM, while the second prime mover is operating at 1344 RPM (800×a motor gear chain ratio of 1.68).

After full engagement of the synchronizing clutch 28, and as soon as the first prime mover 22 is producing positive torque, the synchronizing clutch will be turned off 330, the transmission will be back in the mixer mode, and new control commands will be sent to both the motor and the engine. According to the exemplary embodiment illustrated in FIG. 3, when the synchronizing clutch 28 is turned off, the first and second shafts 40, 41 may independently rotate and drive the components of the planetary gear set 48. Because the synchronizing clutch 28 is disengaged as both the first and second prime movers 22, 26 are outputting the same ratio, the transfer from a locked planetary gear set 48 to an unlocked planetary gear set is smooth and substantially unnoticeable by a vehicle operator or passenger. After disengagement of the synchronizing clutch 28, the first prime mover 22 tends to govern the initial increase in mixer output due to a lack of a chain ratio as applied to the motor gear chain of the second prime mover 26. Once the synchronizing clutch 28 is fully disengaged, the transmission is again in the mixer mode and new commands are sent to both the first and second prime movers 22, 26 so that they may operate independently to drive the mixer output.

Once the first and second prime movers 22, 26 are independently operating, the first prime mover is accelerated up to a constant RPM 340, as illustrated in FIG. 3. When the first prime mover has reached a desired constant RPM 340, further acceleration may be provided by increasing the output of the second prime mover 26. As illustrated in FIG. 3, changes in engaged gear ratios are accompanied by modifications in velocity output provided by the second prime mover 26. By maintaining the first prime mover 22 at a constant RPM when operating as an internal combustion engine, the first prime mover 22 experiences less wear than during variable operation, and accelerations and decelerations are smoother as influenced solely by the second prime mover 26.

Additionally, the operational speed of the second prime mover 26 may be reduced because the mixer output is supplemented by the output of the first prime mover 22. Further, the ability to operate the first prime mover 22 at customizable reference velocity while supplying mixer output modifications through variation of the velocity output of the second prime mover 26 allows for the customization of the resulting exhaust temperature. That is, the reference engine speed maintained by the first prime mover 22 can be increased or decreased to vary the exhaust temperatures and emission of the first prime mover. Lower operational speeds tend to produce hotter exhausts and vice versa. Any modification in output produced by the increase or decrease in the reference engine speed may be compensated by the second prime mover 26. In a vehicle employing an internal combustion engine as the first prime mover 22 and an electric/hydraulic motor as the second prime mover 26, the above events result in a smooth and efficient transfer from an all electric/hydraulic drive, to engine-electric/hydraulic parallel drive, all while starting the engine and conducting a gear ratio change in the transmission virtually simultaneously. Additionally, the engine start may be performed without shifting the multi-ratio transmission 52 into neutral. More specifically, the process illustrated in FIG. 3 provides for start up of the first prime mover 22 without significantly interrupting the torque on the transmission input shaft 44. By accelerating the operating velocity of the first prime mover to substantially match the velocity of the transmission input shaft 44, disengagement of the synchronizing clutch 28 results in a smooth and efficient engagement.

According to an exemplary embodiment of the process illustrated in FIG. 3, the inertias of the first and second prime movers 22, 26, the predetermined trigger velocities, and clutch engagement times 310, 320, 330 are tailored to provide that the mixer output RPM is the same RPM as the planetary gear set 48 output after the synchronizing clutch 28 is fully applied. This tailoring of inertias, trigger velocities, and clutch engagement times increases the efficiency of the transition from one operating mode to another. If the engine's initial throttle setting is, for example, 800 RPM and the planetary gear set 48 output is 800 RPM, the target RPMs are the same. In the ratios selected prior to the lock-up, according to one exemplary embodiment, the second prime mover 26 would be rotating at 4848 RPM, the first prime mover 22 at zero, and the transmission input shaft 44 at 800 RPM. When the clutch is fully locked up, the first primary mover 22 is at 800 RPM, the transmission input shaft 44 is at 800 RPM, and the second primary mover 26 is at 1344 RPM (800×chain ratio of 1.68). To further tailor the efficiency of the transition from one operating mode to another, the second primary mover 26 operating as an electric motor can provide negative or positive torque during and after the engagement of the synchronizing clutch 28 to insure a smooth engagement. Positive torque may also be delivered to the driveline by the second primary mover 26 during shift to insure a smooth engagement.

Additionally, when less than full power is being requested from the first prime mover 22, a portion of the power generated by the first prime mover 22 and applied to the hybrid transmission 24 may be routed through the planetary gear set 48 and into the second prime mover 26. In this mode of operation, the routed power from first prime mover 22 may be used to drive second prime mover 26 functioning as a generator or pump to store energy in energy storage device 38B. This mode of operation may occur at any time during operation of first prime mover 22, even when the vehicle is at rest and the multi-ratio transmission 52 is in neutral. Furthermore, when the second prime mover 26 functions as an electric generator, the first prime mover 22 may be used to selectively drive second prime mover 26 to supply electric power for on-board or off-board electrical equipment of the vehicle via the existing drive inverter 39. Similarly, when the second prime mover 26 functions as a hydraulic pump, the first prime mover 22 may be used to selectively drive the second prime mover 26 to provide fluid power for on-board or off-board hydraulic equipment.

Figure 4A:
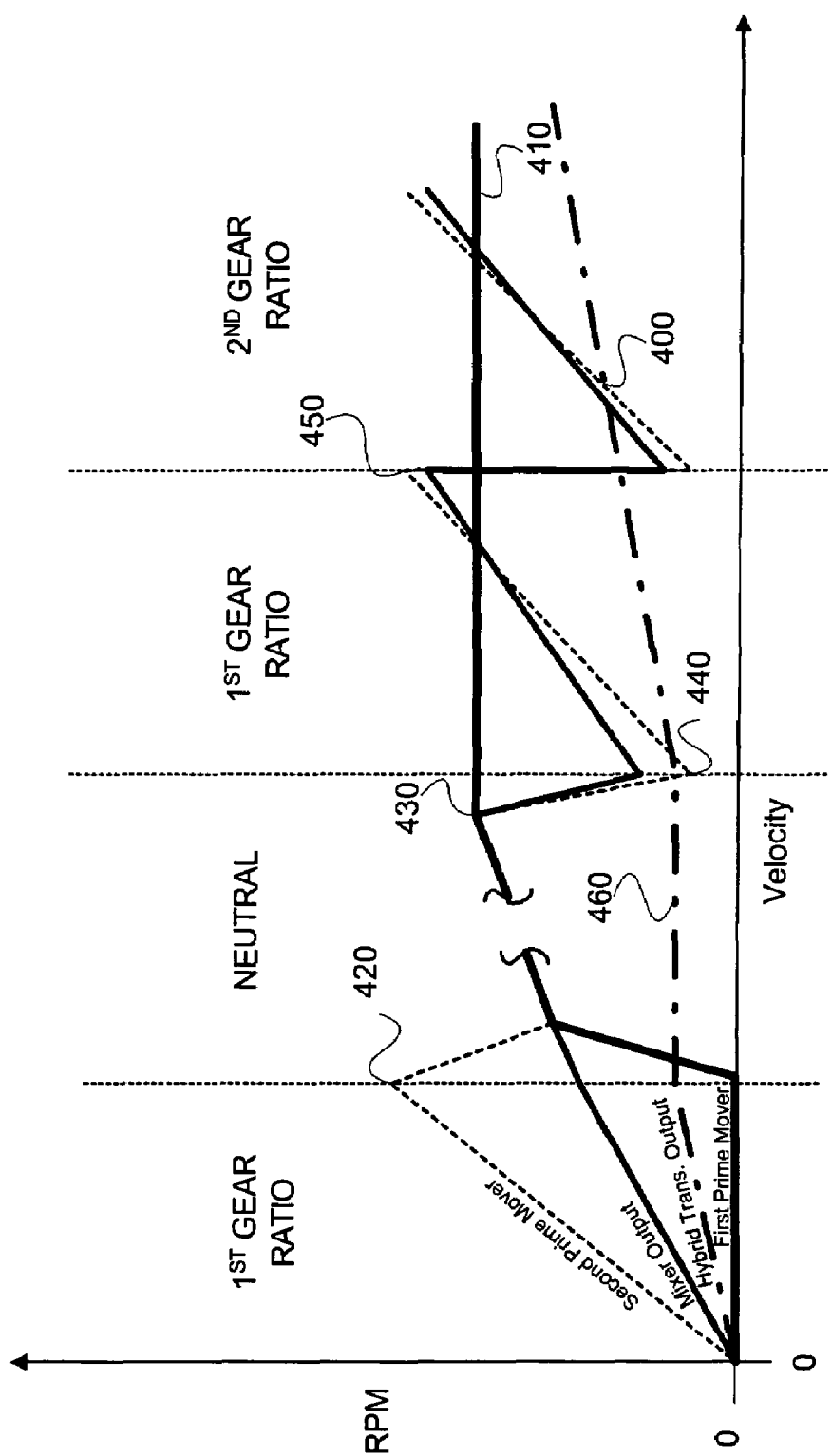
FIG. 4A is a diagram illustrating the starting of a first prime mover with a second prime mover during a shift event according to one exemplary embodiment.
Figure 4B:
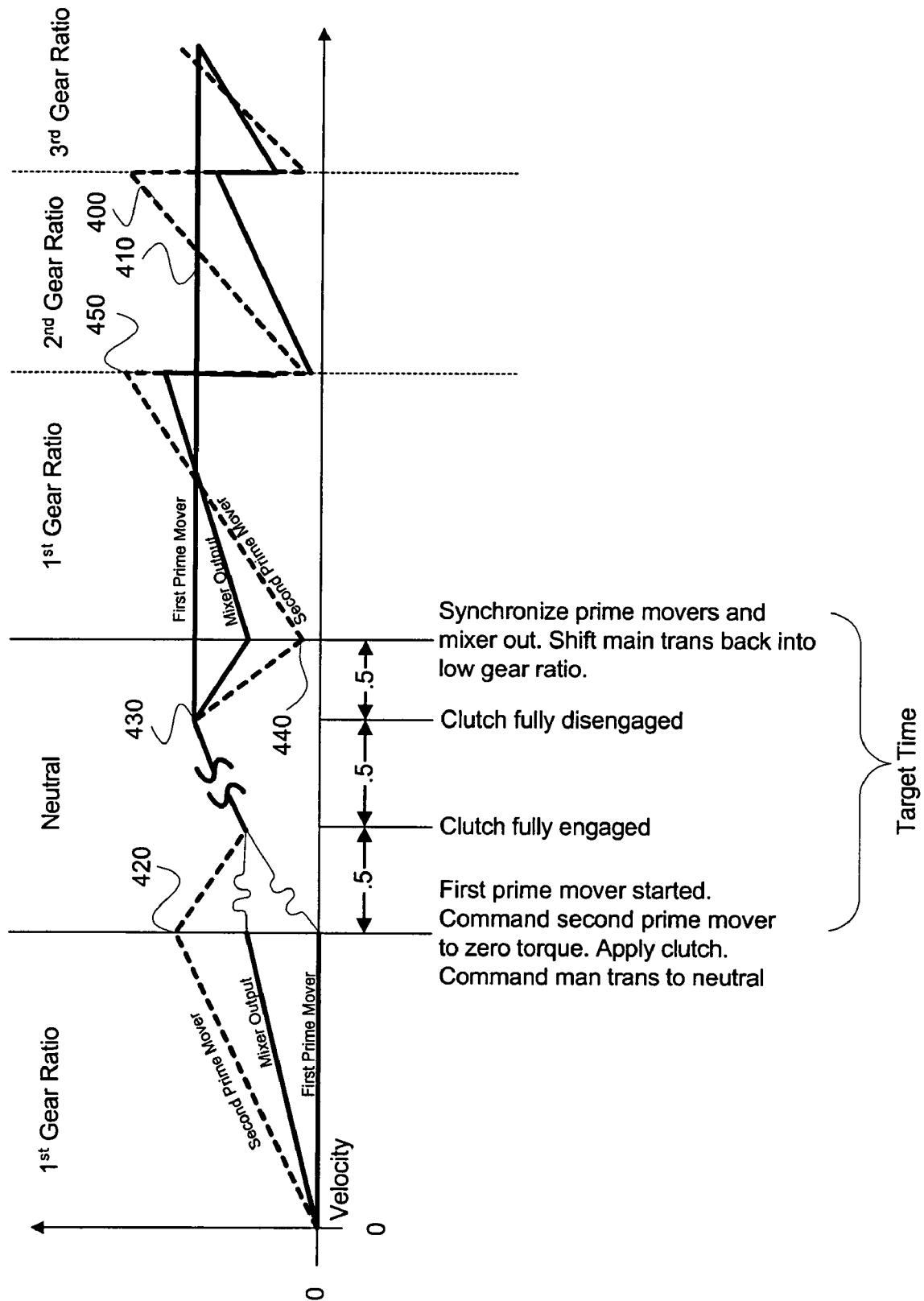
FIG. 4B is a chart illustrating a starting of a first primary mover with a planetary lockup during a shift event according to one exemplary embodiment.
Figure 4C:
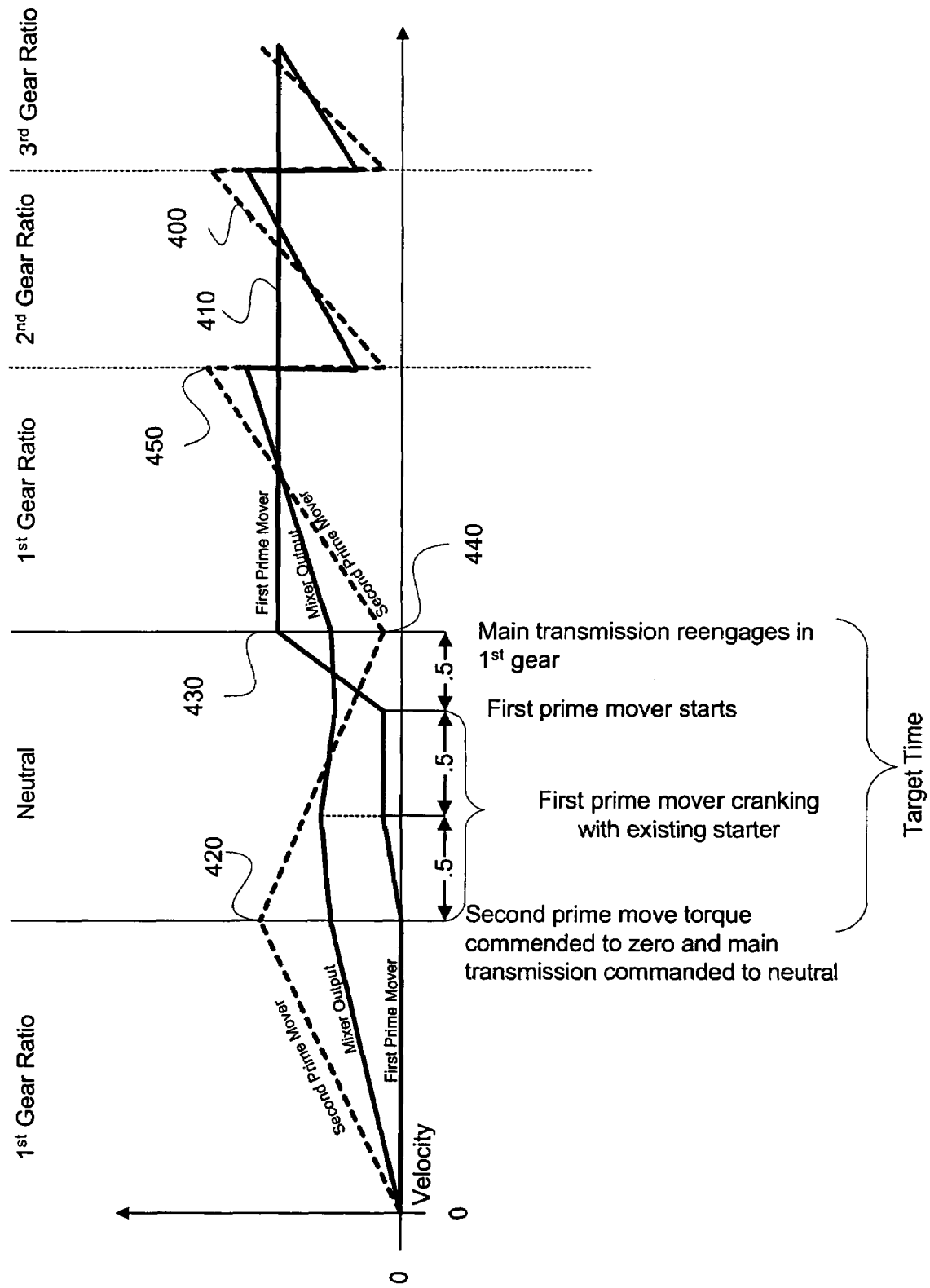
FIG. 4C is a chart illustrating a starting of a first primary mover with an original starter during a shift event according to one exemplary embodiment.

FIGS. 4A, 4B, and 4C illustrate a second exemplary method for initiating a start sequence in a first prime mover 22 using a hybrid transmission such as that illustrated in FIG. 2. As illustrated in FIG. 4A, the second prime mover 26 generates the initial vehicle velocity as the transmission 52 operates in a first gear ratio, as illustrated by line 400 representing the rotational velocity of the second prime mover. As the second prime mover rotational velocity 400 increases to a pre-determined RPM 420, an auto shift event is triggered and a startup and acceleration of the first prime mover 22 is initiated. During the auto shift event, the first gear ratio in the transmission 52 is disengaged to avoid driveline issues such as negative driveline torque. With the first gear ratio disengaged, the rotational velocity of the first prime mover 410 is increased to a desired speed 430 and the rotational velocity of the second prime mover 400 is reduced to a predetermined velocity 440. The auto shift event is then terminated and the first 22 and second 26 prime movers operate in parallel drive to drive the hybrid transmission 52. During the auto shift event, there is an interruption with the first gear ratio as the hybrid transmission 52 is shifted to neutral and the velocity of the vehicle, represented in FIG. 4A by the hybrid transmission output velocity 460, is maintained by the vehicle momentum. Consequently, the startup and acceleration sequence of the first prime mover 22 is substantially undetectable by a vehicle operator and drive feel is enhanced. FIGS. 4B and 4C illustrate two exemplary methods for performing the above-mentioned initiation of a start sequence during an auto shift event, as described in further detail below.

FIG. 4B illustrates an exemplary method for initiating a start sequence by transferring rotational energy from the second prime mover 26 to the first prime mover 22 similar to that previously discussed with reference to FIG. 3. As illustrated in the exemplary embodiment of FIG. 4B, the rotational velocity of the second prime mover 400 is first accelerated to a desired velocity 420. Once the second prime mover 400 has achieved the desired velocity 420, an auto shift event is initiated. Upon initiation of the auto shift event, the transmission 52 is shifted to neutral and the synchronizing clutch 28 is engaged in the hybrid transmission 24. With the synchronizing clutch 28 engaged, a planetary lockup condition exists and the rotational energy of the second prime mover 26 is transferred to the first prime mover 22, as described above with reference to FIGS. 2 and 3. Once the first prime mover 22 is started by the rotational energy of the second prime mover 26, the second prime mover 26 may be used to accelerate the rotational velocity of the first prime mover 410 to a desired velocity represented in FIG. 4 by point 430. As the rotational velocity of the first prime mover 410 is increased, the rotational velocity of the second prime mover 26 is reduced to point 440 to maintain a constant output velocity to the transmission input shaft 44 from the planetary gear set 48.

When the rotational velocity of the first prime mover 410 has been accelerated to the desired velocity 430 and the rotational velocity of the second prime mover 400 has been reduced to point 440, the auto shift event may be concluded by engaging a gear ratio to drive the vehicle. According to the exemplary embodiment illustrated in FIG. 4B, the same gear ratio that was disengaged when the above-mentioned engine start sequence was initiated is reengaged after the start sequence has been performed. More particularly, if the hybrid transmission 24 is operating in a first gear ratio, for example, when the auto shift event is triggered and the engine start sequence is initiated, the auto shift event will conclude by reengaging the first gear ratio with the hybrid transmission 24 operating in a mixer mode. As the second prime mover 26 accelerates the first prime mover 22 to the desired velocity 430 the rotational velocity of the second prime mover 400 is reduced to maintain a constant output velocity to the transmission input shaft 44. Consequently, an increase in vehicle speed is still available after the engine start sequence using the first gear ratio by increasing the rotational velocity of the second prime mover 400 within its appropriate operating velocities.

After the first gear ratio has been reengaged, acceleration of the vehicle is accomplished by increasing the rotational velocity of the second prime mover 400 until a predetermined rotational velocity 450 is obtained. According to one exemplary embodiment, the predetermined rotational velocity 450 may be substantially equivalent to rotational velocity 420. Once the predetermined rotational velocity 450 of the second prime mover 26 is reached, another auto shift event is triggered. As illustrated in FIG. 4B, when the auto shift event occurs to shift the gear ratio from the first gear ratio to the second gear ratio, the rotational velocity of the second prime mover 400 is reduced as the rotational velocity of the first prime mover 410 remains substantially constant. Subsequent accelerations and decelerations of the vehicle are then controlled by increases and decreases of the second prime mover rotational velocity 410. In other words, with each subsequent auto shift event that modifies the gear ratio implemented by the transmission 52, the rotational velocity of the second prime mover 400 is modified as the gear ratio changes while the rotational velocity of the first prime mover 410 is maintained at substantially the same RPM.

According to one exemplary embodiment, the auto shift events that occur after the first prime mover 22 has been started may be used to charge an energy storage device 38B. Auto shift events that occur after the first prime mover 22 has been started would typically waste energy. More specifically, after the first prime mover 22 is started, the output of the planetary gear set 48 would freely rotate, without transferring torque to an output, as the transmission gear ratios are disengaged. In contrast, the present exemplary embodiment allows the traditionally wasted torque to charge an energy storage device 38B through a drive inverter 39 during the auto shift events, thereby enhancing the energy efficiency of the system.

FIG. 4C illustrates an alternative method for initiating a start sequence during an auto shift event, according to a second exemplary embodiment. As illustrated in FIG. 4C, the second prime mover 26 is accelerated to a desired rotational velocity 420. Once the second prime mover 26 has been accelerated to the desired velocity 420, an auto shift event is initiated. Upon initiation of the auto shift event, the transmission 52 is shifted to neutral, thereby eliminating the transfer of torque from the second prime mover 26 to the gears of the hybrid transmission 52.

With the hybrid transmission 52 in neutral, the first prime mover may be cranked. As illustrated, the first prime mover may be cranked, according to the present exemplary embodiment, with a traditional starter. Since the hybrid transmission is in a neutral condition, the starting of the first prime mover 22 with a traditional starter or another cranking device does not disrupt the torque transferred to the vehicle wheels and is, therefore, substantially undetectable by a vehicle operator.

Once the first prime mover 22 is started, it may be fueled and accelerated to a desired velocity 430 during the auto shift event. As illustrated in FIG. 4C, the rotational velocity of the second prime mover 26 is simultaneously reduced to a predetermined velocity 440 to maintain a substantially constant output velocity to the transmission input shaft 44 from the planetary gear set 48. According to one exemplary embodiment, once the first prime mover 22 is started, the first prime mover and the second prime mover 26 are assigned a target velocity. The system controllers 30, 32, 34, and/or 36 are then used to dynamically monitor the velocities of the prime movers 22, 26, as well as the velocity of the hybrid transmission 52. During the monitoring, the system controllers may dynamically adjust the target velocity for the first prime mover 22. When the calculated velocity of the planetary gear set 48, based on the planetary gear ratios and the velocities of the first and second prime movers 22 and 26 match the rotational velocity of the hybrid transmission 52, the auto shift event may be concluded by engaging a gear ratio to drive the vehicle. According to the exemplary embodiment illustrated in FIG. 4C, the same gear ratio that was disengaged when the above-mentioned engine start sequence was initiated is reengaged after the start sequence has been performed, as described previously with reference to FIG. 4B.

While the features of the present system and method are particularly suited for transitioning between operating sequences while the associated vehicle is moving, it is possible to operate the second prime mover 26 to start the first prime mover 22 functioning as an engine while the vehicle is at rest, and then launch the vehicle solely under the power of first prime mover 22 or under parallel power (i.e., combined power of first and second prime movers 22, 26). Optionally, when the second prime mover 26 is directly connected to the transmission input shaft 44 via the planetary gear set 48, the first prime mover 22 may be shut down and the vehicle operated solely under the power of the second prime mover 26, provided that the second prime mover 26 is appropriately configured for this mode of operation.

Among other features, the hybrid transmission 24 may be readily installed in an existing vehicle driveline. Once installed, the present system and method provide for rolling engine start features in hybrid vehicles and allows the vehicle to be operated solely under the power of second prime mover 26, while maintaining the normal operating characteristics of the vehicle driveline, such as normal vehicle clutching and/or automated transmission operation. Further, when the first prime mover torque, planet gear set ratio, and second prime mover torque are properly matched, a desirable and tailored feel can be achieved at the time when first prime mover, second prime mover, and the driveline come together in parallel operation. This feature is accomplished, for example, by configuring the hybrid powertrain system 20 such that the sum of the first and second prime mover torque is substantially similar to the second prime mover torque multiplied by the planetary gear set ratio.

The present hybrid powertrain system also provides for a simple engine start-up sequence that does not require a reversal of motor direction. This feature is supported by the ability to selectively lock the planetary gear set 48 by synchronizing a plurality of input shafts. Thus, first prime mover 22 operating as a heavy duty diesel engine may be started and brought up to operating speed without the roughness experienced in non-motor assisted diesel engine start and acceleration sequences. Further, the use of multiple planetary gears and drive paths are eliminated by maintaining a constant direction of the second prime mover 26, according to one exemplary embodiment.

The present exemplary system and method have been particularly shown and described with reference to the foregoing embodiments, which are merely illustrative of the best modes for carrying out the system and method. It should be understood by those skilled in the art that various alternatives to the embodiments of the system and method described herein may be employed in practicing the system and/or method, without departing from the spirit and scope thereof as defined in the following claims. It is intended that the following claims define the scope of the system and method and that the systems and methods within the scope of these claims and their equivalents be covered thereby. This description of the system and method should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicular hybrid powertrain system, comprising:
   a first prime mover having an output;
   a second prime mover having an output;
   a synchronizing clutch selectively coupling said first prime mover output and said second prime mover output;
   a multi-ratio transmission having an input; and
   a planetary gear set operatively coupling said second prime mover output to said first prime mover output or said multi-ratio transmission input based on a coupling state of said synchronizing clutch;
   wherein said synchronizing clutch is configured to couple said first prime mover output and said second prime mover output until a rotational velocity of said first prime mover output substantially matches a rotational velocity of said multi-ratio transmission input.

2. The vehicular hybrid powertrain system of claim 1, wherein said planetary gear set multiplies a gear ratio of said second prime mover sufficiently to launch said vehicular hybrid powertrain system in a first transmission ratio solely using power produced by said second prime mover.

3. The vehicular hybrid powertrain system of claim 2 further comprising:
   a reaction member coupled to the output of said first prime mover;
   said reaction member being configured to prevent a transfer of negative driveline torque to said first prime mover when said second prime mover is operatively coupled to said multi-ratio transmission input.

4. The vehicular hybrid powertrain system of claim 3, wherein said reaction member comprises a one-way clutch.

5. The vehicular hybrid powertrain system of claim 1, wherein said planetary gear set comprises:
   a sun gear coupled to said second prime mover output;
   a planet gear moveably coupled to said sun gear, wherein said planet gear is operatively coupled to said multi-ratio transmission input; and
   a ring gear configured to house said planet gear, wherein said ring gear is formed on said first prime mover output.

6. The vehicular hybrid powertrain system of claim 5, wherein said planetary gear set is configured to multiply a ratio of said second prime mover.

7. The vehicular hybrid powertrain system of claim 1, wherein said planetary gear set selectively couples both said first prime mover output and said second prime mover output to said multi-ratio transmission input.

8. The vehicular hybrid powertrain system of claim 1, wherein said second prime mover output is configured to rotate in a single direction.

9. A vehicular hybrid powertrain system, comprising:
   a first prime mover having an output;
   a second prime mover having an output;
   a synchronizing clutch selectively coupling said first prime mover output and said second prime mover output;
   a multi-ratio transmission having an input; and
   a planetary gear set operatively coupling said second prime mover output to said first prime mover output or said multi-ratio transmission input based on a coupling state of said synchronizing clutch;
   wherein engaging said synchronizing clutch couples said first prime mover output to said second prime mover output;
   said coupling of said first prime mover output to said second prime mover output locking out said planetary gear set.

10. A vehicular hybrid powertrain system comprising:
    a first prime mover having an output;
    a second prime mover having an output;
    a synchronizing clutch selectively coupling said first prime mover output and said second prime mover output;
    a multi-ratio transmission having an input; and
    a planetary gear set operatively coupling said second prime mover output to said first prime mover output or said multi-ratio transmission input based on a coupling state of said synchronizing clutch;
    wherein said synchronizing clutch is configured to disengage when a speed of the transmission input is substantially equal to an output speed of said first prime mover.

11. A vehicular hybrid powertrain system, comprising:
    a first prime mover having an output;
    a second prime mover having an output;
    a synchronizing clutch selectively coupling said first prime mover output and said second prime mover output;
    a multi-ratio transmission having an input;
    a planetary gear set operatively coupling said second prime mover output to said first prime mover output or said multi-ratio transmission input based on a coupling state of said synchronizing clutch said planetary gear set including a sun gear coupled to said second prime mover output, a planet gear moveably coupled to said sun gear, wherein said planet gear is operatively coupled to said multi-ratio transmission input, and a ring gear configured to house said planet gear, wherein said ring gear is formed on said first prime mover output;
    wherein said planetary gear set is configured to drive a rotation of said first prime mover output to start said first prime mover, and operate said first prime mover and said second prime mover in parallel to drive said multi-ratio transmission input; and
    wherein said synchronizing clutch is configured to couple said first prime mover output and said second prime mover output until a rotational velocity of said first prime mover output substantially matches a rotational velocity of said multi-ratio transmission input.

12. The vehicular hybrid powertrain system of claim 11, further comprising:
    a reaction member coupled to said first prime mover output;
    said reaction member being configured to prevent a transfer of negative driveline torque to said first prime mover when said second prime mover is operatively coupled to said multi-ratio transmission input.

13. The vehicular hybrid powertrain system of claim 12, wherein said reaction member comprises a one-way clutch.

14. A vehicular hybrid powertrain system, comprising:
    a first prime mover having an output;
    a second prime mover having an output;
    a synchronizing clutch selectively coupling said first prime mover output and said second prime mover output;
    a multi-ratio transmission having an input;
    a planetary gear set operatively coupling said second prime mover output to said first prime mover output or said multi-ratio transmission input based on a coupling state of said synchronizing clutch said planetary gear set including a sun gear coupled to said second prime mover output, a planet gear moveably coupled to said sun gear, wherein said planet gear is operatively coupled to said multi-ratio transmission input, and a ring gear configured to house said planet gear, wherein said ring gear is formed on said first prime mover output;

wherein said planetary gear set is configured to drive a rotation of said first prime mover output to start said first prime mover, and operate said first prime mover and said second prime mover in parallel to drive said multi-ratio transmission input;

wherein:

engaging said synchronizing clutch couples said first prime mover output to said second prime mover output; and wherein said coupling of said first prime mover output to said second prime mover output locks-out said planetary gear set.

15. A vehicular hybrid powertrain system, comprising:
a first prime mover having an output;
a second prime mover having an output;
a synchronizing clutch selectively coupling said first prime mover output and said second prime mover output;
a multi-ratio transmission having an input;
a planetary gear set operatively coupling said second prime mover output to said first prime mover output or said multi-ratio transmission input based on a coupling state of said synchronizing clutch said planetary gear set including a sun gear coupled to said second prime mover output, a planet gear moveably coupled to said sun gear, wherein said planet gear is operatively coupled to said multi-ratio transmission input, and a ring gear configured to house said planet gear, wherein said ring gear is formed on said first prime mover output;
wherein said planetary gear set is configured to drive a rotation of said first prime mover output to start said first prime mover, and operate said first prime mover and said second prime mover in parallel to drive said multi-ratio transmission input; and
wherein said synchronizing clutch is configured to disengage when a speed of said transmission input is substantially equal to a speed of said first prime mover output.

16. A method of operating a vehicular hybrid powertrain system, comprising:
providing a first prime mover having an output, a second prime mover having an output, a synchronizing clutch selectively coupling said first prime mover output and said second prime mover output, a multi-ratio transmission having an input, and a planetary gear set operatively coupling said second prime mover output to said first prime mover output or to said multi-ratio transmission input based on a coupling state of said synchronizing clutch;
rotating said second prime mover output to drive rotation of said multi-ratio transmission input;
engaging said synchronizing clutch to couple said second prime mover output and said first prime mover output while decoupling said second prime mover output from said multi-ratio transmission input;
cranking said first prime mover with said second prime mover output.

17. The method of claim 16, further comprising:
accelerating a rotational velocity of said first prime mover to substantially match a rotational velocity of said multi-ratio transmission input; and
disengaging said synchronizing clutch to allow said first prime mover output and said second prime mover output to operate in parallel to drive said multi-ratio transmission input.

18. The method of claim 17, wherein said multi-ratio transmission remains engaged during said cranking and said acceleration of said first prime mover.

19. The method of claim 16, wherein said cranking said first prime mover compris:
coupling said second prime mover output to said first prime mover output; and
starting said first prime mover with the rotation of said second prime mover output when said first prime mover is an internal combustion engine.

20. The method of claim 19, further comprising disengaging said synchronizing clutch when a speed of said first prime mover output is substantially equal to a speed of said second prime mover output.

21. A vehicular hybrid powertrain system, comprising:
a first prime mover having an output;
a second prime mover having an output;
a synchronizing clutch selectively coupling said first prime mover output and said second prime mover output;
a multi-ratio transmission having an input; and
a planetary gear set operatively coupling said second prime mover output to said first prime mover output or said multi-ratio transmission input based on a coupling state of said synchronizing clutch;
wherein said vehicular hybrid powertrain system is configured to rotate said second prime mover output to drive rotation of said multi-ratio transmission input, engage said synchronizing clutch to couple said second prime mover output and said first prime mover output while decoupling said second prime mover output from said multi-ratio transmission input, and crank said first prime mover with said second prime mover output.

22. The vehicular hybrid powertrain system of claim 21, wherein said powertrain system is further configured to accelerate a rotational velocity of said first prime mover to substantially match a rotational velocity of said multi-ratio transmission input, and disengage said synchronizing clutch when a rotational velocity of said first prime mover substantially matches a rotational velocity of said multi-ratio transmission input.

23. The vehicular hybrid powertrain system of claim 21, wherein said planetary gear set is configured to:
drive a rotation of said flit prime mover output with said second prime mover output to start said first prime mover; and
operate said first prime mover and said second prime mover in parallel to drive said multi-ratio transmission input.

* * * * *